(12) United States Patent
Patel et al.

(10) Patent No.: US 10,795,756 B2
(45) Date of Patent: Oct. 6, 2020

(54) SYSTEM AND METHOD TO PREDICTIVELY SERVICE AND SUPPORT THE SOLUTION

(71) Applicant: EMC IP Holding Company LLC, Hopkinton, MA (US)

(72) Inventors: Dharmesh M. Patel, Round Rock, TX (US); Rizwan Ali, Cedar Park, TX (US); Ravikanth Chaganti, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 194 days.

(21) Appl. No.: 15/961,298

(22) Filed: Apr. 24, 2018

(65) Prior Publication Data

US 2019/0324841 A1    Oct. 24, 2019

(51) Int. Cl.
*G06F 11/00* (2006.01)
*G06F 11/07* (2006.01)
*G06N 5/02* (2006.01)

(52) U.S. Cl.
CPC ........ *G06F 11/0793* (2013.01); *G06F 11/079* (2013.01); *G06F 11/0709* (2013.01); *G06N 5/02* (2013.01)

(58) Field of Classification Search
CPC ............. G06F 11/0736; G06F 11/0784; G06F 11/079; G06F 11/263; G05B 23/0227;
(Continued)

(56) References Cited

U.S. PATENT DOCUMENTS 5,483,637 A   1/1996  Winokur et al.
5,867,714 A * 2/1999 Todd .................. G06F 8/64
                                                707/999.01
(Continued)

OTHER PUBLICATIONS

Extended European Search Report issued in corresponding European Application No. 18200661.9 dated Apr. 1, 2019. (9 pages).
Extended European Search Report issued in corresponding European Application No. 19151952.9, dated Jul. 1, 2019.
"Integrated Dell Remote Access Controller 8 (iDRAC8)", Version 2.05.05.05 User's Guide, Dell Inc., Dec. 2014 (348 pages).
(Continued)

*Primary Examiner* — Bryce P Bonzo
*Assistant Examiner* — Jeison C Arcos
(74) *Attorney, Agent, or Firm* — Chamberlain, Hrdlicka, White, Williams & Aughtry

(57) ABSTRACT

A system state monitor for managing a distributed system includes a persistent storage and a processor. The persistent storage includes a heuristically derived knowledge base. The processor performs deployment-level monitoring of deployments of the distributed system and identifies a common component failure of components of the deployments based on the deployment-level monitoring. In response to identifying the common component failure, the processor identifies impacted computing devices each hosting a respective component of the components; obtains deployment level state information from each of the impacted computing devices; identifies an iterative set of outcome driven corrective actions based on the obtained deployment level state information and the heuristically derived knowledge base; and initiates a computing device correction on an impacted computing device of the impacted computing devices using the iterative set of outcome driven corrective actions to obtain a corrected computing device.

17 Claims, 10 Drawing Sheets

(58) Field of Classification Search
CPC .... G05B 23/0278; G06Q 40/08; G06Q 30/06; G06Q 30/0609; G06Q 30/0641
See application file for complete search history.

(56) References Cited

U.S. PATENT DOCUMENTS

| | | | |
|---|---|---|---|
| 6,012,152 A * | 1/2000 | Douik | G06F 11/0709 714/26 |
| 6,317,028 B1 | 11/2001 | Valiulis | |
| 6,633,782 B1 * | 10/2003 | Schleiss | G05B 23/0229 700/18 |
| 6,742,141 B1 | 5/2004 | Miller | |
| 6,795,935 B1 * | 9/2004 | Unkle | G05B 23/0275 340/438 |
| 7,103,874 B2 | 9/2006 | McCollum et al. | |
| 7,222,127 B1 | 5/2007 | Bem et al. | |
| 7,334,222 B2 * | 2/2008 | Keller | H04L 41/06 717/135 |
| 7,490,073 B1 * | 2/2009 | Qureshi | G06F 11/079 706/50 |
| 7,500,142 B1 | 3/2009 | Cowart et al. | |
| 7,516,362 B2 | 4/2009 | Connelly et al. | |
| 7,536,595 B1 * | 5/2009 | Hiltunen | G06F 11/0709 714/26 |
| 7,757,124 B1 * | 7/2010 | Singh | G06F 11/3476 714/32 |
| 7,831,693 B2 | 11/2010 | Lai | |
| 7,886,031 B1 | 2/2011 | Taylor et al. | |
| 7,987,353 B2 | 7/2011 | Holdaway et al. | |
| 8,001,527 B1 * | 8/2011 | Qureshi | G06F 11/079 717/120 |
| 8,166,552 B2 | 4/2012 | Prafullchandra et al. | |
| 8,386,930 B2 | 2/2013 | Dillenberger et al. | |
| 8,401,982 B1 | 3/2013 | Satish et al. | |
| 8,583,769 B1 | 11/2013 | Peters et al. | |
| 8,639,798 B2 | 1/2014 | Akiyama et al. | |
| 8,774,054 B2 | 7/2014 | Yin et al. | |
| 8,826,077 B2 | 9/2014 | Bobak et al. | |
| 8,868,987 B2 | 10/2014 | Wagner | |
| 8,874,892 B1 | 10/2014 | Chan et al. | |
| 8,938,621 B2 | 1/2015 | Mao et al. | |
| 8,995,439 B2 | 3/2015 | Field | |
| 9,122,501 B1 | 9/2015 | Hsu et al. | |
| 9,122,739 B2 | 9/2015 | Yadwadkar et al. | |
| 9,201,751 B1 | 12/2015 | Muthirisavenugopal et al. | |
| 9,225,625 B1 * | 12/2015 | He | G06F 9/542 |
| 9,229,902 B1 * | 1/2016 | Leis | H04L 41/082 |
| 9,278,481 B2 | 3/2016 | Hull | |
| 9,355,036 B2 | 5/2016 | Beard et al. | |
| 9,384,082 B1 | 7/2016 | Lee et al. | |
| 9,542,177 B1 | 1/2017 | Johansson et al. | |
| 9,729,615 B2 * | 8/2017 | Nair | H04L 67/10 |
| 9,864,634 B2 | 1/2018 | Kenkre et al. | |
| 9,898,224 B1 | 2/2018 | Marshak et al. | |
| 9,999,030 B2 | 6/2018 | Gu et al. | |
| 10,048,996 B1 * | 8/2018 | Bell | G06F 11/3452 |
| 10,057,184 B1 | 8/2018 | Prahlad et al. | |
| 10,097,620 B2 | 10/2018 | Reddy et al. | |
| 10,514,907 B2 | 12/2019 | Chaganti et al. | |
| 2003/0149919 A1 | 8/2003 | Greenwald et al. | |
| 2004/0078683 A1 * | 4/2004 | Buia | H04L 12/66 714/37 |
| 2004/0088145 A1 | 5/2004 | Rosenthal | |
| 2004/0177168 A1 | 9/2004 | Alabraba et al. | |
| 2004/0177354 A1 | 9/2004 | Gunyakti et al. | |
| 2004/0225381 A1 | 11/2004 | Ritz et al. | |
| 2004/0250260 A1 * | 12/2004 | Pioso | G06F 11/0709 719/316 |
| 2005/0033770 A1 | 2/2005 | Oglesby et al. | |
| 2005/0078656 A1 * | 4/2005 | Bryant | H04L 45/02 370/351 |
| 2005/0120112 A1 | 6/2005 | Wing et al. | |
| 2005/0144151 A1 * | 6/2005 | Fischman | G06N 5/045 706/45 |
| 2005/0144188 A1 * | 6/2005 | Bailey | G06F 11/008 |
| 2006/0149408 A1 | 7/2006 | Speeter et al. | |
| 2006/0178864 A1 | 8/2006 | Khanijo | |
| 2006/0179116 A1 | 8/2006 | Speeter et al. | |
| 2006/0235962 A1 | 10/2006 | Vinberg et al. | |
| 2007/0143851 A1 | 6/2007 | Nicodemus et al. | |
| 2007/0202469 A1 | 8/2007 | Davidson | |
| 2008/0037532 A1 * | 2/2008 | Sykes | H04L 41/147 370/389 |
| 2008/0065700 A1 * | 3/2008 | Lim | G06F 21/604 |
| 2008/0201470 A1 | 8/2008 | Sayama | |
| 2008/0228755 A1 | 9/2008 | Haga et al. | |
| 2008/0262860 A1 * | 10/2008 | Schneider | G06Q 10/10 705/1.1 |
| 2009/0012805 A1 | 1/2009 | Schnell et al. | |
| 2009/0113248 A1 * | 4/2009 | Bock | G06F 11/079 714/39 |
| 2009/0165099 A1 | 6/2009 | Eldar et al. | |
| 2009/0183010 A1 | 7/2009 | Schnell et al. | |
| 2009/0260071 A1 | 10/2009 | Sadovsky et al. | |
| 2009/0282283 A1 | 11/2009 | Sakakura et al. | |
| 2010/0024001 A1 | 1/2010 | Campbell | |
| 2010/0057677 A1 * | 3/2010 | Rapp | G06F 11/0709 707/E17.014 |
| 2010/0180221 A1 * | 7/2010 | Cloward | G06F 16/2365 715/764 |
| 2010/0229022 A1 | 9/2010 | Anand et al. | |
| 2010/0312522 A1 * | 12/2010 | Laberge | G05B 23/0227 702/184 |
| 2010/0318487 A1 * | 12/2010 | Marvasti | G06N 20/00 706/47 |
| 2010/0325493 A1 | 12/2010 | Morimura et al. | |
| 2011/0078428 A1 | 3/2011 | Hamid | |
| 2011/0093703 A1 | 4/2011 | Etchegoyen | |
| 2011/0270482 A1 * | 11/2011 | Holzer | G05B 19/4184 701/31.4 |
| 2011/0289342 A1 | 11/2011 | Schaefer et al. | |
| 2011/0289343 A1 | 11/2011 | Schaefer et al. | |
| 2011/0302305 A1 | 12/2011 | Morimura et al. | |
| 2012/0041976 A1 | 2/2012 | Annapragada | |
| 2012/0110142 A1 | 5/2012 | Montagna et al. | |
| 2012/0144244 A1 * | 6/2012 | Dan | G11C 29/10 714/39 |
| 2012/0150926 A1 | 6/2012 | Adkins et al. | |
| 2012/0166142 A1 | 6/2012 | Maeda et al. | |
| 2012/0182151 A1 | 7/2012 | Tong | |
| 2012/0233216 A1 | 9/2012 | Lim | |
| 2012/0265872 A1 * | 10/2012 | Chilton | G06F 11/3013 709/224 |
| 2012/0271927 A1 | 10/2012 | Shakirzyanov et al. | |
| 2012/0331526 A1 | 12/2012 | Caudle et al. | |
| 2013/0151975 A1 | 6/2013 | Shadi et al. | |
| 2013/0185667 A1 * | 7/2013 | Harper | G06F 11/0709 715/772 |
| 2013/0317870 A1 * | 11/2013 | Franco | G06Q 10/06 705/7.11 |
| 2013/0326029 A1 | 12/2013 | Flynn | |
| 2014/0069291 A1 | 3/2014 | Yang | |
| 2014/0082417 A1 * | 3/2014 | Barton | G06F 11/079 714/26 |
| 2014/0115176 A1 | 4/2014 | Kamboh et al. | |
| 2014/0281675 A1 | 9/2014 | Sreenivasan et al. | |
| 2014/0304399 A1 | 10/2014 | Chaudhary et al. | |
| 2014/0304402 A1 | 10/2014 | Prakash et al. | |
| 2014/0324276 A1 * | 10/2014 | Weaks | G06Q 10/063 701/31.4 |
| 2015/0117174 A1 | 4/2015 | Alber et al. | |
| 2015/0120359 A1 * | 4/2015 | Dongieux | G06Q 10/0633 705/7.15 |
| 2015/0149822 A1 | 5/2015 | Coronado et al. | |
| 2015/0256394 A1 | 9/2015 | Palmer | |
| 2016/0042288 A1 | 2/2016 | Cohen et al. | |
| 2016/0048611 A1 | 2/2016 | Cox | |
| 2016/0057009 A1 | 2/2016 | Kadayam et al. | |
| 2016/0110240 A1 | 4/2016 | Reger et al. | |
| 2016/0112504 A1 | 4/2016 | Mathur et al. | |
| 2016/0173690 A1 * | 6/2016 | Perez | G06F 17/16 379/265.03 |

(56) References Cited

U.S. PATENT DOCUMENTS

| | | |
|---|---|---|
| 2016/0294643 A1 | 10/2016 | Kim |
| 2016/0302323 A1 | 10/2016 | Gosselin |
| 2017/0017881 A1 | 1/2017 | Langley et al. |
| 2017/0032091 A1* | 2/2017 | Rudorfer .............. G16H 40/40 |
| 2017/0094003 A1 | 3/2017 | Gahlot et al. |
| 2017/0206128 A1* | 7/2017 | Anderson ............. G06F 11/079 |
| 2017/0339005 A1 | 11/2017 | Yuan et al. |
| 2018/0025166 A1 | 1/2018 | Daniel et al. |
| 2018/0034709 A1 | 2/2018 | Chen et al. |
| 2018/0041388 A1 | 2/2018 | Moens et al. |
| 2018/0285009 A1 | 10/2018 | Guim Bernat et al. |
| 2018/0302277 A1 | 10/2018 | Shimamura et al. |
| 2018/0321934 A1 | 11/2018 | Chaganti et al. |
| 2018/0322019 A1 | 11/2018 | Stowell et al. |
| 2018/0329579 A1 | 11/2018 | Kaimal et al. |
| 2019/0123985 A1 | 4/2019 | Rao et al. |
| 2019/0149408 A1 | 5/2019 | Li |
| 2019/0182105 A1* | 6/2019 | Stephens ............. H04L 41/0672 |
| 2019/0303137 A1 | 10/2019 | Chaganti et al. |
| 2019/0306013 A1 | 10/2019 | Ali et al. |
| 2019/0324841 A1 | 10/2019 | Patel et al. |

OTHER PUBLICATIONS

Iler, Doug, et al., "Introducing iDRAC8 with Lifecycle Controller for Dell 13th Generation PowerEdge Servers", a Dell Deployment and Configuration Guide, Dell Inc., Sep. 2014 (16 pages).

Zhengyu Liang et al.; "ClusterProbe: An Open, Flexible and Scalable Cluster Monitoring Tool"; IEEE Computer Society International Workshop on Cluster Computing; pp. 261-268; 1999.

Duncan Tweed; "BMC Atrium Discovery User Guide"; BMC Software, Inc.; Mar. 2014; retrieved from https://bmc.com/.

Duncan Tweed; "Baseline configuration"; BMC Software, Inc.; Apr. 7, 2015; retrieved from https://bmc.com/.

Masoom Parvez; "AutomaticGroup Node"; BMC Software, Inc.; 2014; retrieved from https://bmc.com/.

"Dell DRAC—Wikipedia"; XP055602141; Mar. 23, 2018; https://en.wikipedia.org/w/index.php?title=Dell_DRAC&oldid=831957421.

"Dell EMC OpenManage Essentials Version 2.3: User's Guide"; XP055602720; Oct. 1, 2017; https://topics-cdn.dell.com/pdf/openmanage-essentials-v23 users-guide en-us.pdf.

* cited by examiner

SYSTEM AND METHOD TO PREDICTIVELY SERVICE AND SUPPORT THE SOLUTION

BACKGROUND

Computing devices may include any number of internal components such as processors, memory, and persistent storage. Each of the internal components may operate with other components of the computing devices. For example, some processors store generated data in a persistent storage and may utilize capacity of the memory to perform computations.

In a network environment, multiple computing devices may cooperate to accomplish a task. For example, multiple computing devices may perform different computations that may be used, in turn, to generate a final result.

SUMMARY

In one aspect, a system state monitor for managing a distributed system in accordance with one or more embodiments of the invention includes a persistent storage and a processor. The persistent storage includes a heuristically derived knowledge base. The processor performs deployment-level monitoring of deployments of the distributed system and identifies a common component failure of components of the deployments based on the deployment-level monitoring. In response to identifying the common component failure, the processor identifies impacted computing devices each hosting a respective component of the components; obtains deployment level state information from each of the impacted computing devices; identifies an iterative set of outcome driven corrective actions based on the obtained deployment level state information and the heuristically derived knowledge base; and initiates a computing device correction on an impacted computing device of the impacted computing devices using the iterative set of outcome driven corrective actions to obtain a corrected computing device.

In one aspect, a method for managing a distributed system in accordance with one or more embodiments of the invention includes performing deployment-level monitoring of deployments of the distributed system and identifying a common component failure of components of the deployments based on the deployment-level monitoring. The method further includes, in response to identifying the common component failure, identifying impacted computing devices each hosting a respective component of the components; obtaining deployment level state information from each of the impacted computing devices; identifying an iterative set of outcome driven corrective actions based on the obtained deployment level state information and a heuristically derived knowledge base; and initiating a computing device correction on an impacted computing device of the impacted computing devices using the iterative set of outcome driven corrective actions to obtain a corrected computing device.

In one aspect, a non-transitory computer readable medium in accordance with one or more embodiments of the invention includes computer readable program code, which when executed by a computer processor enables the computer processor to perform a method for managing a distributed system, the method includes performing deployment-level monitoring of deployments of the distributed system and identifying a common component failure of components of the deployments based on the deployment-level monitoring. The method further includes, in response to identifying the common component failure, identifying impacted computing devices each hosting a respective component of the components; obtaining deployment level state information from each of the impacted computing devices; identifying an iterative set of outcome driven corrective actions based on the obtained deployment level state information and a heuristically derived knowledge base; and initiating a computing device correction on an impacted computing device of the impacted computing devices using the iterative set of outcome driven corrective actions to obtain a corrected computing device.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing distributed system. A distributed system may include any number of deployments that perform function of the distributed system. Similarly, each deployment may include any number of computing devices that perform functions of the deployments.

In one or more embodiments of the invention, the system includes a support manager that monitors the distributed system and identifies common component failures across multiple deployments. In response to the identified common component failures, the support manager may perform an iterative set of outcome driven corrective actions that remediate the common component failures. By using information obtained from each deployment, the overall number of corrective actions may be reduce and, consequently, the uptime and performance of the distributed system may be improved.

In one or more embodiments of the invention, the system includes a heuristically derived knowledge base. The knowledge base may associate corrective actions with states of deployments which are, in turn, linked to other corrective actions. In this manner, an iterative set of outcome driven corrective actions may be identified. Since the next selected corrective action is based on the outcome of a previously performed corrective action, the corrective actions may be dynamically selected and based on the most up to date state of the distributed system.

Figure 1A:
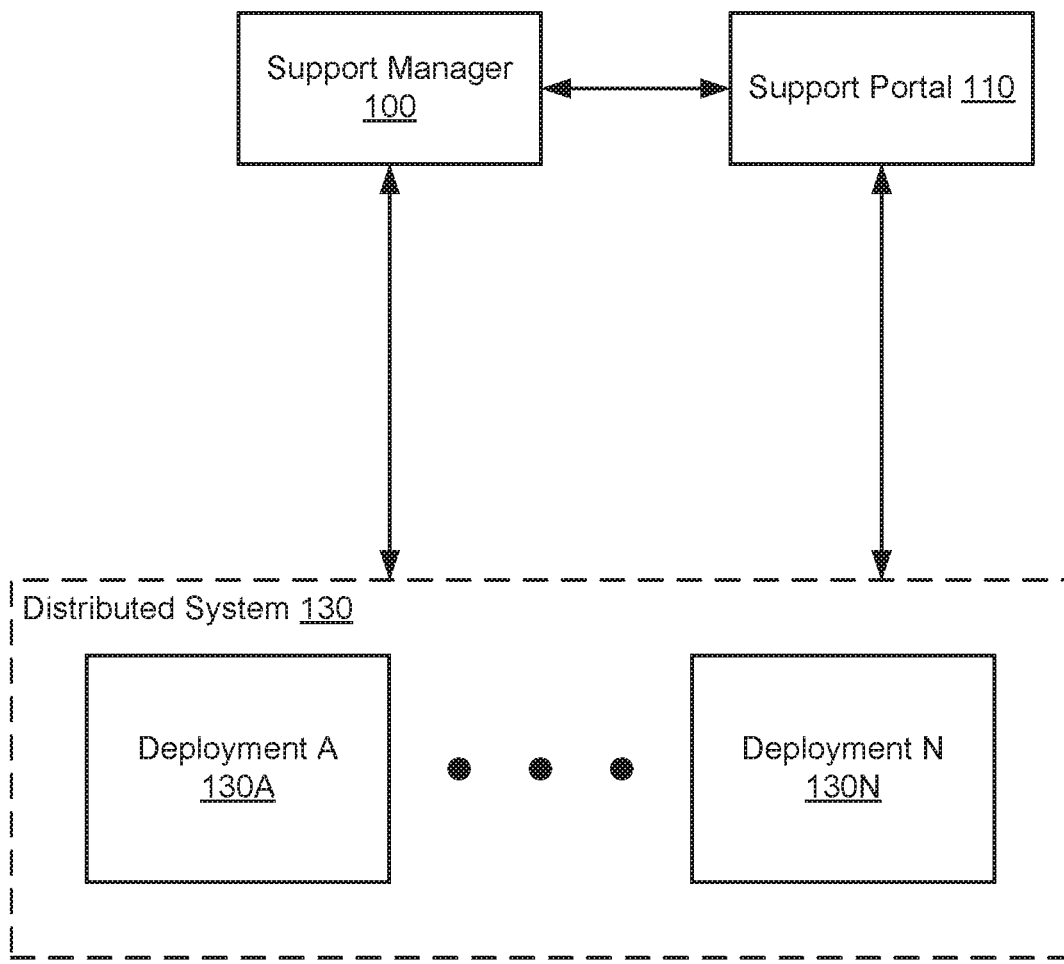
FIG. 1A shows a diagram of a system in accordance with one or more embodiments of the invention.

FIG. 1 shows a system in accordance with one or more embodiments of the invention. The system may include a support manager (100) that manages a distributed system (130). The support manager (100) may obtain deployment-level information regarding the state of the deployments (130A, 130N) of the distributed system (130). Based on the monitoring, the support manager (100) may identify a common component failure and perform an iterative set of outcome driven correction actions to remediate the common component failure. The system may further include a support portal (110) that facilitates performance of the iterative set of outcome driven correction actions. Each of the aforementioned components may be operably connected by any combination of wired and wireless networks. Each components is discussed below.

In one or more embodiments of the invention, the support manager (100) diagnoses and remediates problems of the distributed system (130) that may otherwise disrupt the functionality of the distributed system (130). To provide the aforementioned functionality, the support manager (100) may perform deployment level monitoring of the deployments (130A, 130N), identify a common component failure based on the monitoring, and take action to address the common component failure. For additional details regarding the support manager (100), See FIG. 2.

In one or more embodiments of the invention, the support manager (100) is a computing device. The computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the support manager (100) described in this application and/or perform all or portion of the methods illustrated in FIGS. 5A-5B. For additional details regarding a computing device, See FIG. 7.

In one or more embodiments of the invention, the support manager (100) is a logical device. A logical device may be a virtual device that utilizes the computing resources of any number of computing devices to perform its functions. The logical device may be implemented as computer instructions, e.g., computer code, that when executed by the processor(s) of one or more computing devices cause the computing devices to perform the functions of the support manager (100) described in this application and/or all or portion of the methods illustrated in FIGS. 5A-5B.

In one or more embodiments of the invention, the support portal (110) facilitates the performance of an iterative set of outcome driven correction actions. The iterative set of outcome driven correction actions may be dynamically generated based on outcome of previously performed actions. For example, the support portal (110) may display actions to a user and obtain input from the user. In this manner, a series of actions may be implemented by a user and the outcome of each action may be obtained. The obtained outcome may be used, in turn, to dynamically generate an additional action. For additional details regarding the support portal, See FIG. 3.

In one or more embodiments of the invention, the support portal (110) is a computing device. The computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the support portal (110) described in this application. For additional details regarding a computing device, See FIG. 7.

In one or more embodiments of the invention, the support portal (110) is a logical device. A logical device may be a virtual device that utilizes the computing resources of any number of computing devices to perform its functions. The logical device may be implemented as computer instructions, e.g., computer code, that when executed by the processor(s) of one or more computing devices cause the computing devices to perform the functions of the support portal (110) described in this application.

In one or more embodiments of the invention, the distributed system (130) performs a predetermined function. The deployments (130A, 130N) may perform different or similar parts of the predetermined function. The distributed system (130) may include any number of deployments without departing from the invention.

For example, a first deployment may provide computing functionality while a second deployment may provide storage functionality. Any number of deployments of the distributed system (130) may perform similar or different functions without departing from the invention.

In one or more embodiments of the invention, each deployment includes any number of computing devices. Each of the computing devices may cooperatively work with the other computing devices to perform a predetermined function of the respective deployment. Similarly, each computing device may include any number of hardware and software components.

Each computing device may be, for example, a mobile phone, a tablet computer, a laptop computer, a desktop computer, a server, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the deployments (130A, 130N) described in this application. For additional details regarding a computing device, See FIG. 7.

Figure 1B:
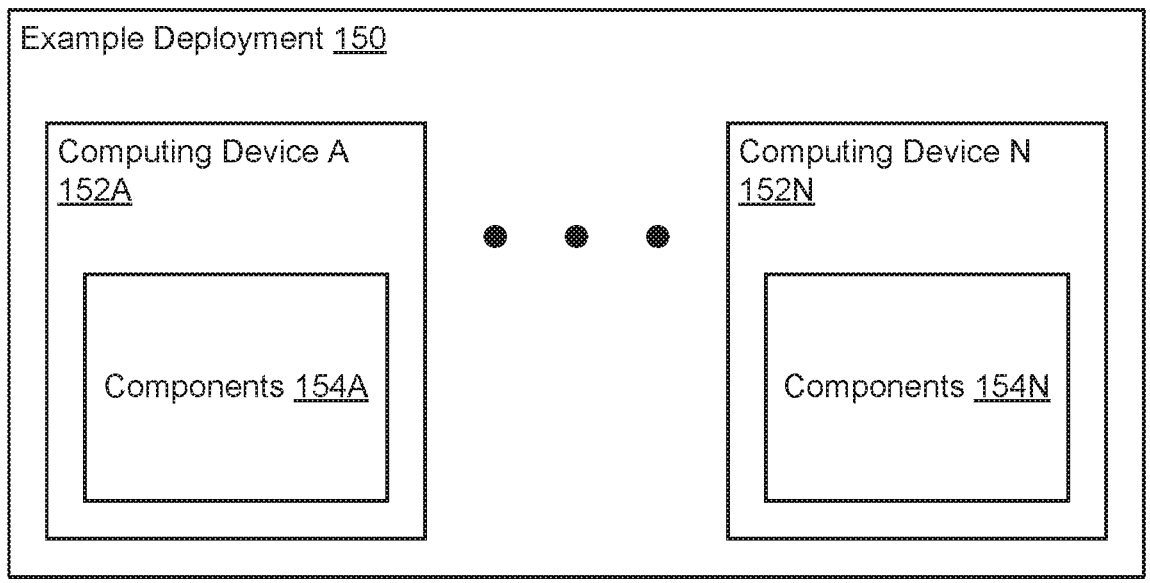
FIG. 1B shows a diagram of a deployment in accordance with one or more embodiments of the invention.

To further clarify deployments, FIG. 1B shows a diagram of an example deployment (150) in accordance with one or more embodiments of the invention. The example deployment (150) includes computing devices (152A, 152N). Each of the computing devices includes respective components (154A, 154N).

Figure 2:
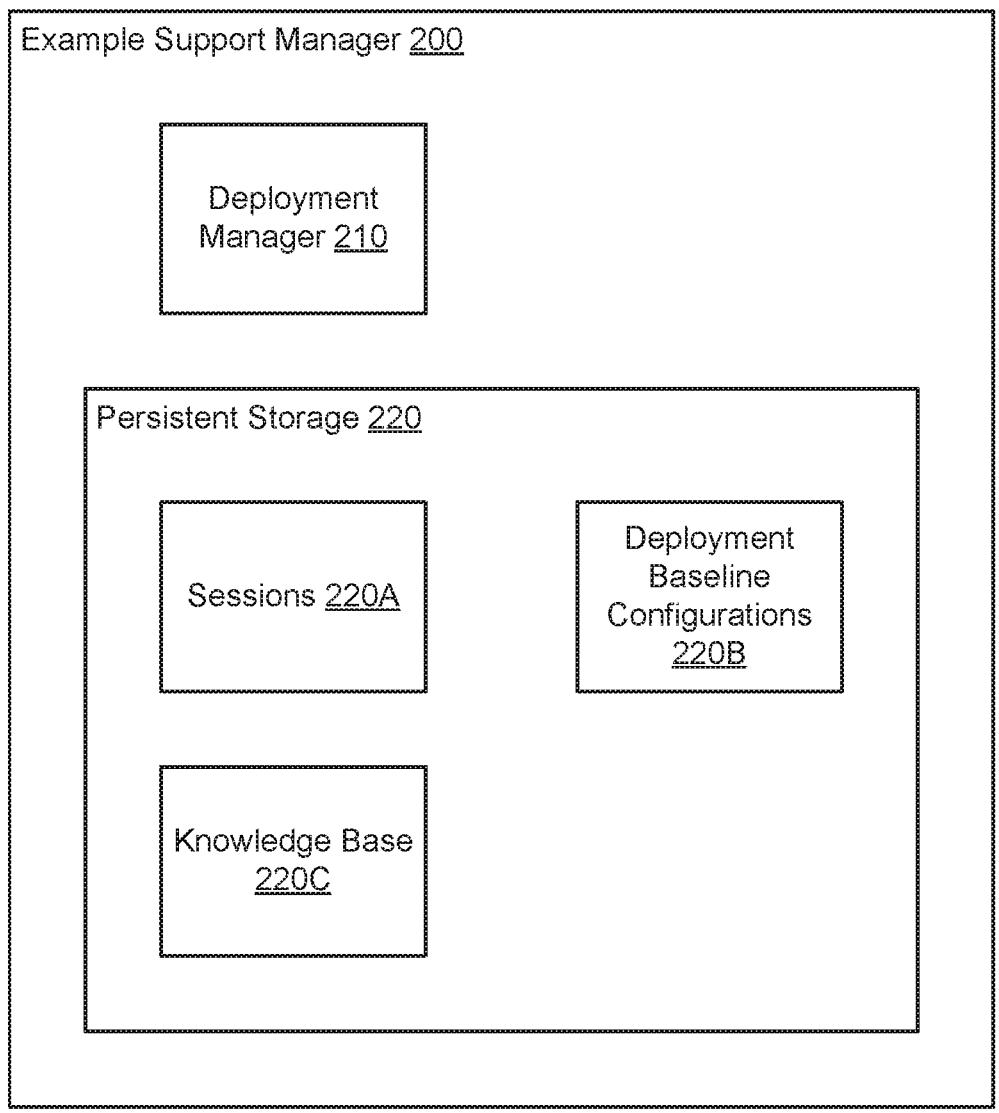
FIG. 2 shows a diagram of an example support manager in accordance with one or more embodiments of the invention.

As discussed above, the support manager may manage the distributed system. FIG. 2 shows a diagram of an example support manager (200) in accordance with one or more embodiments of the invention.

In one or more embodiments of the invention, the example support manager (200) manages a distributed system by: (i) performing deployment level monitoring, (ii) identifying a common component failure among the deployments of a distributed system based on the monitoring, (iii) identifies impacted computing devices of the deployments, (iv) obtains deployment level state information from each deployment having an impacted computing device, (v) identifies a set of outcome driven corrective actions, and (vi) initiates a computing device correction using the identified set of outcome driven correction actions. To provide the aforementioned functionality, the example support manager (200) may include a deployment manager (210) and a persistent storage (220).

In one or more embodiments of the invention, the deployment manager (210) performs the above noted functionality of the example support manager (200).

In one or more embodiments of the invention, the deployment level monitoring includes obtaining hardware state/software state/firmware state/settings from the deployments, identifying differences between the obtained states/settings and a baseline configuration for each deployment, obtaining health indicators of the components of the deployment, and/or collecting transaction logs from the deployments. The aforementioned information may be stored as it is collected and used to determine whether a common component failure has occurred.

In one or more embodiments of the invention, the deployment level state information may include a type of the deployment, e.g., a predetermine function of the deployment. The deployment level state information may include a hardware state of the computing devices of the deployment. The hardware state may be a listing of the physical component of the aforementioned computing devices. The deployment level state information may include a software state of the computing devices, e.g., a listing of the applications, firmware, and associated settings for the applications and firmware of the computing devices. The deployment level state information may include a transaction log of the computing devices, e.g., a listing of the actions performed over a predetermined period of time.

In one or more embodiments of the invention, the deployment manager (210) may dynamically select actions to be performed as part of an iterative set of outcome driven corrective actions. For example, the deployment manager (210) may select a first corrective action, obtain an outcome from the first corrective action, and then select a second corrective action based on the outcome of the first corrective action. This process may be repeated until a common component failure is resolved.

In some scenarios, the deployment manager (210) may send corrective actions to a support portal and/or obtain outcomes after performing corrective actions via the support portal. For example, the deployment manager (210) may send a corrective action to the support portal, obtain an outcome from the support portal, selected a second corrective action based on the obtained outcome, etc. In such a scenario, a user may be performing the corrective actions. In this manner, embodiments of the invention may decrease a cognitive load on a user tasked with repairing a deployment by automating the process of diagnosis of the problem impacting the performance of the deployment.

Figure 5A:
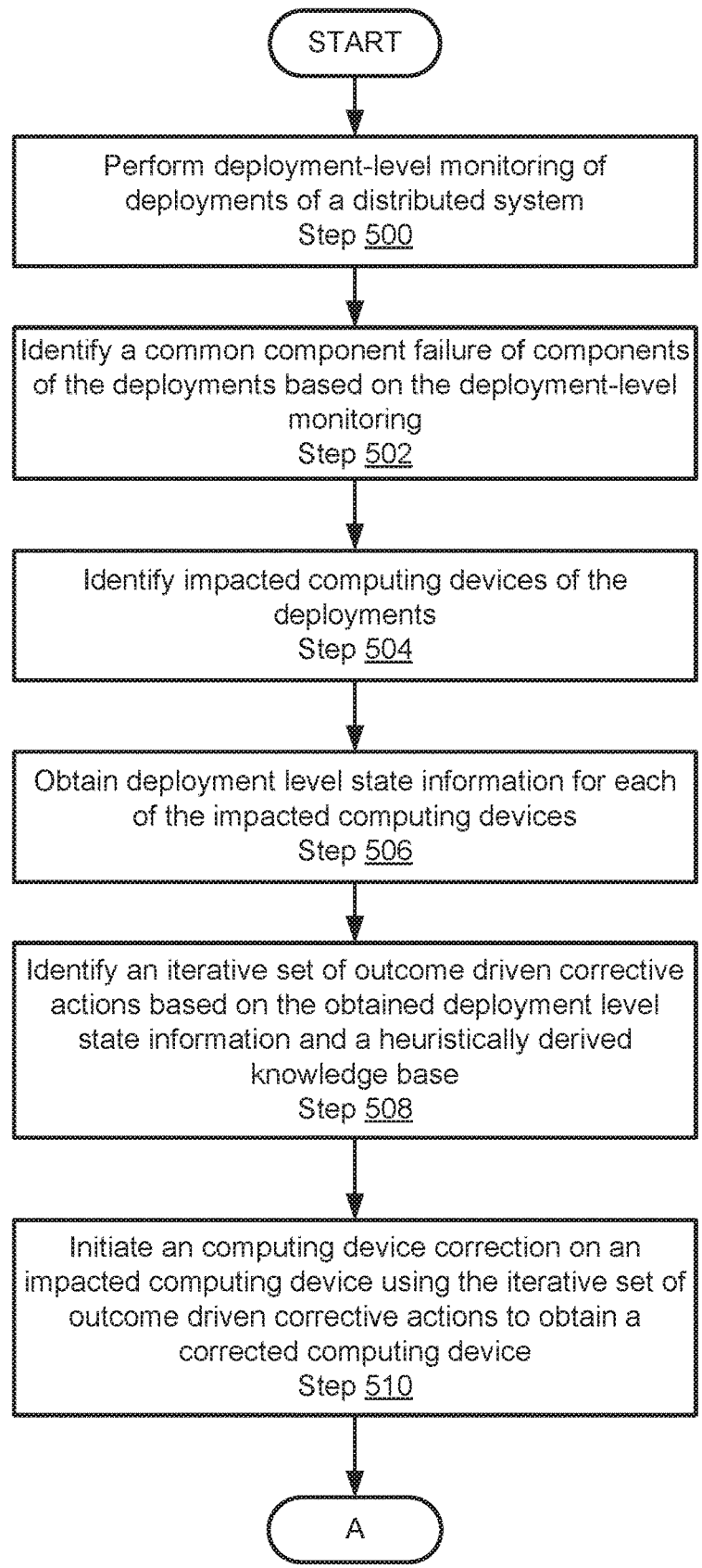
FIG. 5A shows a diagram of a flowchart of a method of managing a distributed system in accordance with one or more embodiments of the invention.
Figure 5B:
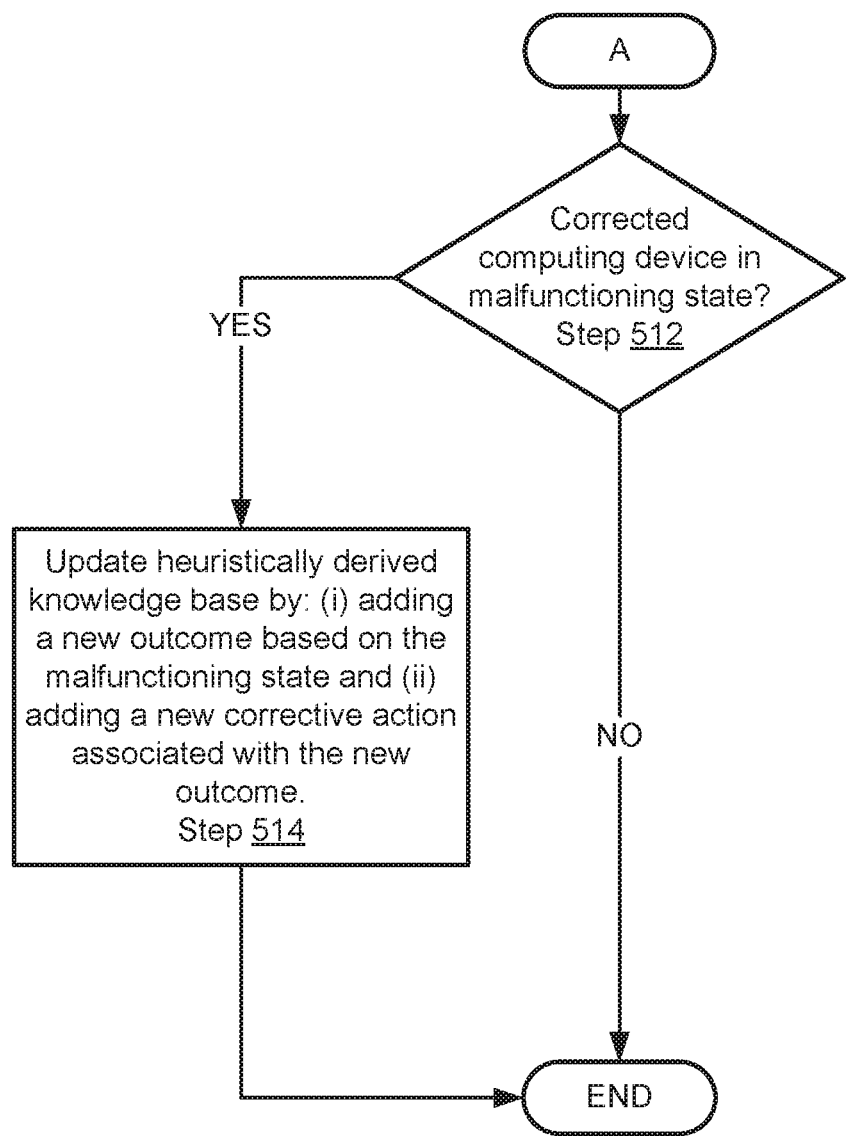
FIG. 5B shows a continuation of the flow chart of FIG. 5A.

To provide the aforementioned functionality, the deployment manager (210) may perform all or a portion of the methods illustrated in FIGS. 5A-5B. When performing the aforementioned methods or other functionality, the deployment manager (210) may utilize data structures stored in the persistent storage (220).

In one or more embodiments of the invention, the deployment manager (210) is a hardware device including circuitry. The deployment manager (210) may be, for example, digital signal processor, a field programmable gate array, or an application specific integrated circuit. The deployment manager (210) may be other types of hardware devices without departing from the invention.

In one or more embodiments of the invention, the deployment manager (210) is implemented as computing code stored on a persistent storage that when executed by a processor performs the functionality of the deployment manager (210). The processor may be hardware processor including circuitry such as, for example, a central processing unit or a microcontroller. The processor may be other types of hardware devices for processing digital information without departing from the invention.

In one or more embodiments of the invention, the persistent storage (220) is a storage device that stores data structures. The persistent storage may be a physical or virtual device. For example, the persistent storage (220) may include solid state drives, solid state drives, tape drives, and other components to provide data storage functionality. Alternatively, the persistent storage (220) may be a virtual device that utilizes the physical computing resources of other components to provide data storage functionality.

In one or more embodiments of the invention, the persistent storage (220) stores sessions (220A), deployment baseline configurations (220B), and a knowledge base (220C). The persistent storage (220) may store additional data structures without departing from the invention.

The sessions (220A) may be data structures that include information regarding support sessions, the support sessions may be ongoing or previously completed. The sessions (220A) may include information obtained to identify a corrective action. For example, the sessions (220A) may include deployment state information used by the deployment manager (210) to identify a corrective action. Each session may be associated with a place in a support queue and a common component failure that caused the session to be initiated. Each session may be generated by the deployment manager (210) when a common component failure was identified.

The deployment baseline configurations (220B) may be a data structure that includes hardware, software, firmware, and setting specifications for each deployment in the distributed system. The deployment baseline configurations (220B) may be used by the deployment manager when attempt to identify corrective actions to be performed.

The knowledge base (220C) may be a data structure used by the deployment manager (210) to identify corrective actions. In other words, the knowledge base (220C) may include deployment level state information and/or outcomes to corrective actions. The mappings may be specified at any of granularity.

The knowledge base (220C) may be generated based on previous support sessions. In other words, the contents of the knowledge base (220C) may be generated heuristically. The knowledge base (220C) may be automatically updated by the deployment manager (210) upon completion of a support session. In other words, the deployment manager (210) may generate a new mapping between deployment level state information or outcomes a corrective actions that resulted in the elimination of a previous common potential component failure, i.e., restored the performance of the distributed cluster. For additional details regarding the knowledge base (220C), See FIG. 4.

The aforementioned mappings of the knowledge base (220C) are unconventional because the mappings assume that a potential component failure is not necessarily based on the component. Rather, the aforementioned mappings make an assumption that the identification of a potential component failure is merely a symptom of a solution level defect. Thus, the knowledge base (220D) mappings are between a solution state and a corrective action, not necessarily a component state and a corrective action.

While the data structures of the persistent storage (220) are illustrated as separate data structures, the aforementioned data structures may be combined with each other and/or other data without departing from the invention. Additionally, while the aforementioned data structures are illustrated as being stored on the example support manager (200), the data structures may be stored on persistent storage of other devices without departing from the invention.

Figure 3:
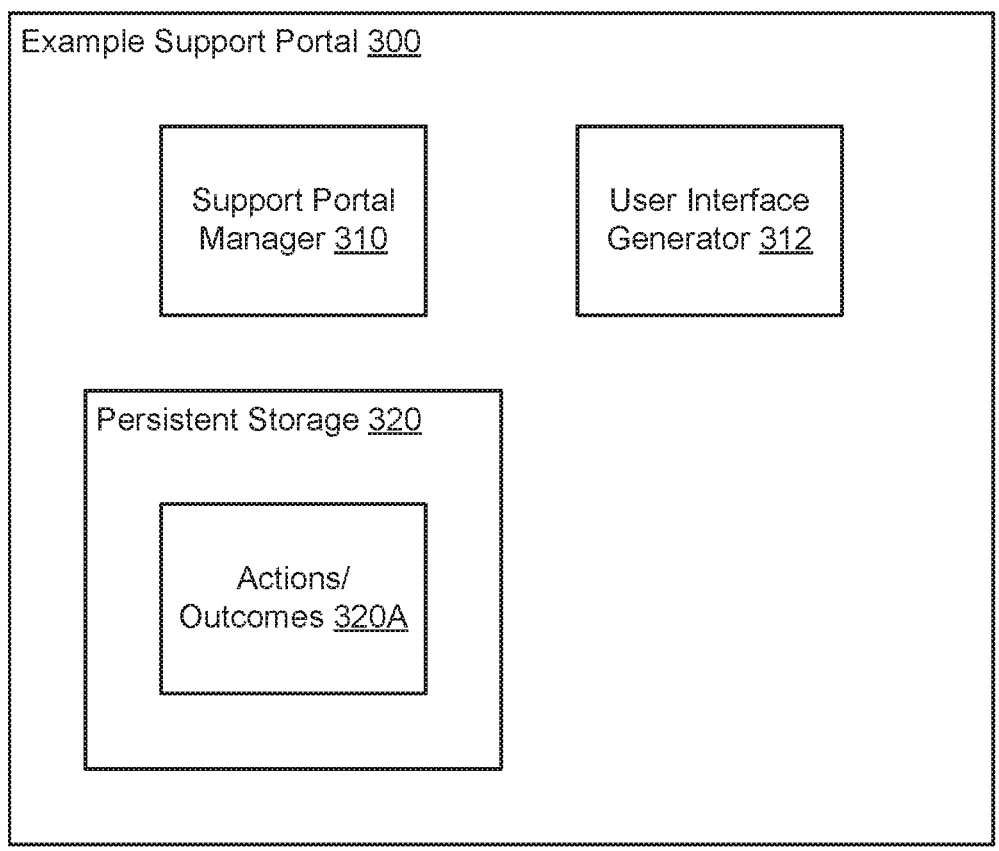
FIG. 3 shows a diagram of an example support portal in accordance with one or more embodiments of the invention.

As discussed above, the example support manager (200) may interact with a support portal when attempting to initiate the performance corrective actions. FIG. 3 shows a diagram of an example support portal (300) in accordance with one or more embodiments of the invention. The example support portal (300) may facilitate the performance of the iterative set of outcome driven corrective actions. To provide the aforementioned functionality, the example support portal (300) may include a support portal manager (310) that obtains corrective actions and displays the corrective actions to a user via a display (not shown). The display may be driven by a user interface generator (312) that generate graphical user interface shown on the display. The generated graphical user interface may enable corrective actions to be displayed to a user and outcomes to be entered by a user. The example support portal (300) may also include a persistent storage (320) storing data structures utilized by the support portal manager (310).

In one or more embodiments of the invention, the support portal manager (310) is a hardware device including circuitry. The support portal manager (310) may be, for example, digital signal processor, a field programmable gate array, or an application specific integrated circuit. The support portal manager (310) may be other types of hardware devices without departing from the invention.

In one or more embodiments of the invention, the support portal manager (310) is implemented as computing code stored on a persistent storage that when executed by a processor performs the functionality of the support portal manager (310). The processor may be hardware processor including circuitry such as, for example, a central processing unit or a microcontroller. The processor may be other types of hardware devices for processing digital information without departing from the invention.

In one or more embodiments of the invention, the user interface generator (312) is a hardware device including circuitry. The user interface generator (312) may be, for example, digital signal processor, a field programmable gate array, or an application specific integrated circuit. The user interface generator (312) may be other types of hardware devices without departing from the invention.

In one or more embodiments of the invention, the user interface generator (312) is implemented as computing code stored on a persistent storage that when executed by a processor performs the functionality of the user interface generator (312). The processor may be hardware processor including circuitry such as, for example, a central processing unit or a microcontroller. The processor may be other types of hardware devices for processing digital information without departing from the invention.

In one or more embodiments of the invention, the persistent storage (320) is a storage device that stores data structures. The persistent storage (320) may be a physical or virtual device. For example, the persistent storage (320) may include solid state drives, solid state drives, tape drives, and other components to provide data storage functionality. Alternatively, the persistent storage (320) may be a virtual device that utilizes the physical computing resources of other components to provide data storage functionality.

In one or more embodiments of the invention, the persistent storage (320) stores actions and/or outcomes (320A). The persistent storage (220) may store additional data structures without departing from the invention.

The actions and/or outcomes (320A) may be data structures that include the actions displayed to a user and the outcomes provided by the user after performing the actions. Copies of the aforementioned data may be sent back to the support manager which, in turn, may use the data to select another corrective action or end the support session.

While the data structure of the persistent storage (320) is illustrated as a solitary data structure, the aforementioned data structure may be combined with other data without departing from the invention. Additionally, while the aforementioned data structure is illustrated as being stored on the example support portal (300), the data structure may be stored on persistent storage of other devices without departing from the invention.

Figure 4:
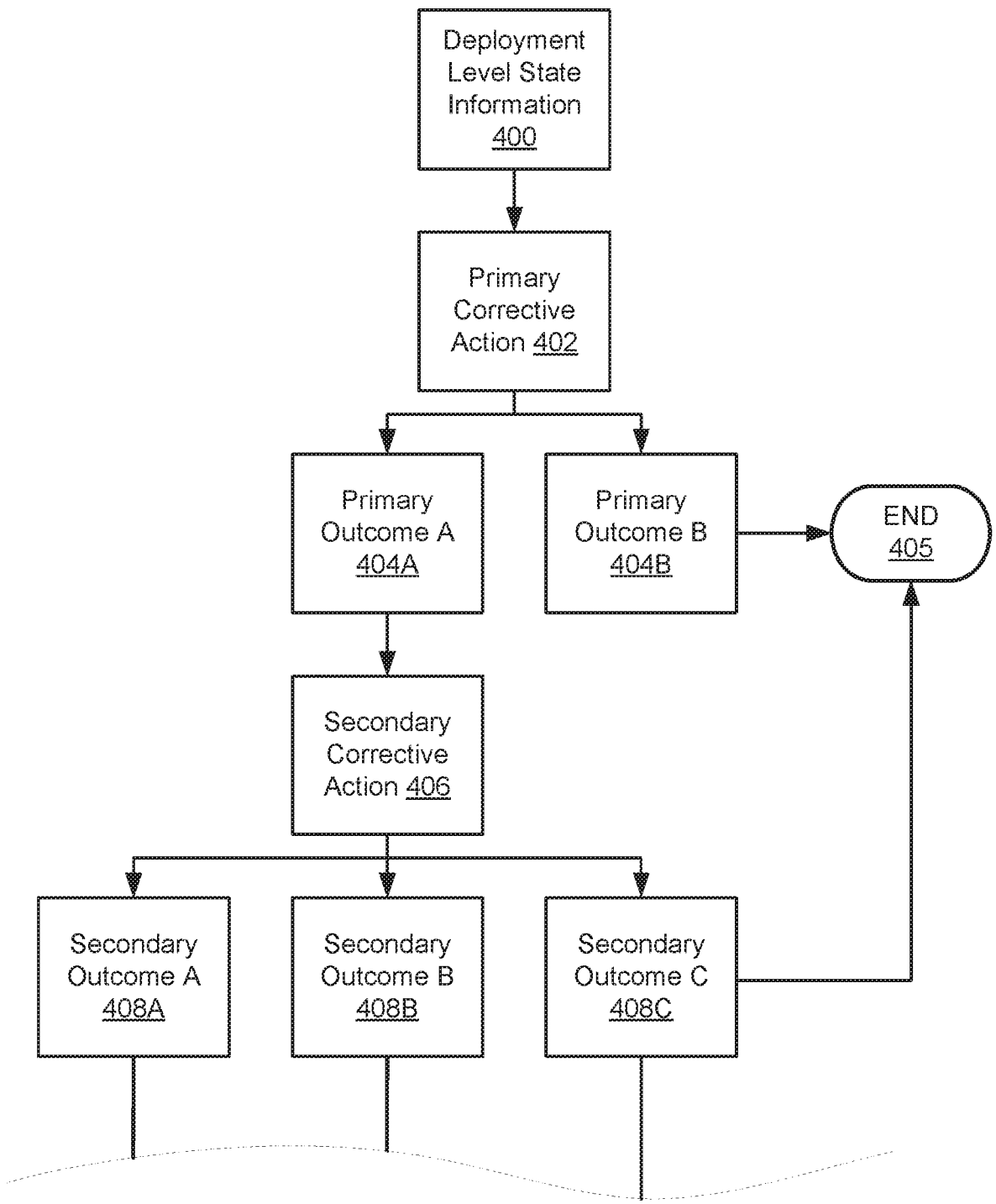
FIG. 4 shows a diagram of a knowledge base in accordance with one or more embodiments of the invention.

FIG. 4 shows a diagram of a knowledge base in accordance with one or more embodiments of the invention. The knowledge base may corrective actions to be performed based on deployment level state information or outcomes.

For example, each deployment level state information (e.g., 400) may have an associated primary corrective action (e.g., 402). Each primary corrective action (402) may have associated primary outcomes (e.g., 404A, 404B). There may be any number of primary outcomes. Each of the primary outcomes may be associated with an end (e.g., 405), that indicates that the common component failure has been resolved, or a secondary corrective action (e.g., 406). Like the primary corrective action, each secondary corrective action may be associated with any number of secondary outcomes (e.g., 408A, 408B, 408C). etc. In this manner, the knowledge base may provide an iterative set of outcomes driven corrective actions (e.g., 402, 406) that may be selected as additional information, i.e., outcomes, is obtained from the deployments.

While the knowledge base is illustrated as a list of associated entries, the information of the knowledge base may be stored in other formats, may include additional, less, and/or different information, and/or may be broken down into multiple data structures without departing from the invention.

As discussed above, the system of FIG. 1A perform the methods of FIGS. 5A-5B.

FIG. 5A shows a flowchart of a method in accordance with one or more embodiments of the invention. The method depicted in FIG. 5A may be used to manage a distributed system in accordance with one or more embodiments of the invention. The method shown in FIG. 5A may be performed by, for example, a support manager (100, FIG. 1A). Other component of the system illustrated in FIG. 1A may perform the method of FIG. 5A without departing from the invention.

In Step 500, deployment-level monitoring of deployments of a distributed system is performed.

In one or more embodiments of the invention, the monitoring may be accomplished by obtaining state information from the deployments and comparing the state information the deployment baseline configurations. The monitoring may be performed, periodically, in accordance with a schedule, or via other regimes. The monitoring may obtain performance characteristics of the deployments such as, for example, a processing rate, bandwidth, or storage rate. The performance characteristics may be other types of characteristics without departing from the invention.

In Step 502, a common component failure of components of the deployments is identified based on the deployment-level monitoring.

In one or more embodiments of the invention, the common component failure may be identified by identifying decreases in the performance characteristics of each of the deployments. Based on the commonly identified decrease in the performance characteristics, a common component failure may be identified. In other words, deployments having a similar decrease in performance may be assumed to have a similar component failure.

In Step 504, computing devices impacted by the common component failure are identified.

The computing devices may be identified, for example, using the baseline configurations for each deployment that may specify each computing device of a deployment.

In Step 506, deployment level state information is obtained from each of the identified computing devices impacted by the common component failure.

In one or more embodiments of the invention, the deployment level state information is obtained by characterizing the performance of each computing device of the deployments having a common component failure.

In Step 508, an iterative set of outcome driven corrective actions based on the obtained deployment level state information and a heuristically derived knowledge base is identified.

In one or more embodiments of the invention, the heuristically derived knowledge base is the same is illustrated in FIG. 4. The iterative set of outcome driven corrective actions may be obtained by matching the deployment level state information to similar information included in the knowledge base. Corrective actions associated with the matches may then be obtained.

In Step 510, a computing device correction on an impacted computing device is initiated using the iterative set of outcome driven corrective actions to obtain a corrected computing device.

Similar computing device corrections may be performed on the other impacted computing devices. As the iterative corrections are performed, outcomes from each performed correction outcome may be collected and correlated to differentiate deployments that have a similar common component failure from other deployments that have other common component failures.

The method may proceed to Step 512 in FIG. 5B following Step 510.

FIG. 5B shows a flowchart of a continuation of the method illustrated in FIG. 5A.

In Step 512, it is determined whether the corrected computing device is in a malfunctioning state. If the corrected computing device is in a malfunctioning state, the method may proceed to Step 514. If the corrected computing device is not in a malfunctioning state, the method may end following Step 512.

To determine whether the computing device is in a malfunctioning state, the performance of the corrected computing device may be characterized and compared to a baseline. If the performance exceeds the baseline, the corrected computing device may be determined to be not malfunctioning.

In Step 514, the heuristically derived knowledge base is updated.

In one or more embodiments of the invention, updating the heuristically derived knowledge base includes: (i) adding a new outcome based on the malfunctioning state of the corrected computing device (in other words, adding a new outcome reflecting the malfunctioning state and associated with the corrective action that was last performed on the corrected computing device) and (ii) adding a new corrective action associated with the new outcome. The new corrective action may be obtained by matching the state of the deployment after correcting the computing device to a deployment level state information of the knowledge base.

The method may end following Step 514.

To further clarify embodiments of the invention, a non-limiting example is provided below and illustrated in FIGS. 6A-6D.

Example 1

Figure 6A:
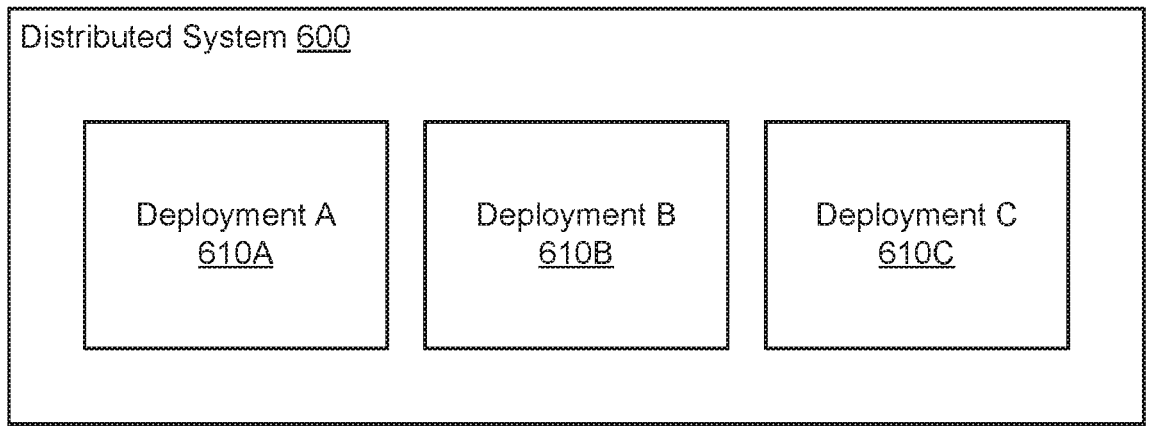
FIG. 6A shows a diagram of an example distributed system.
Figure 6B:
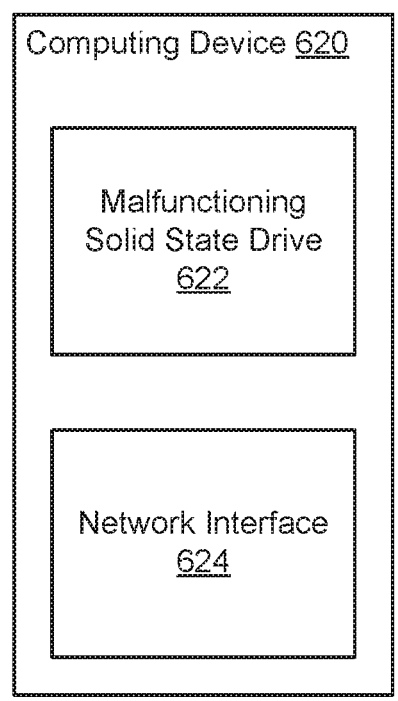
FIG. 6B shows a diagram of a computing device of a deployment of the example distributed system of FIG. 6A.

Consider a distributed system (600) as illustrated in FIG. 6A that includes three deployments (610A, 610B, 610C). Each of the deployments may perform different functions. For example, deployment A (610A) may perform data storage, deployment B (610B) may perform computations, and deployment C (610C) may perform management of deployments A and B.

Due to the high user of the storage resources of deployment A (610A), normal wear and tear may result in the occurrence of a malfunctioning solid state drive (622) of a computing device (620) of deployment A (610A). However, since all three deployments depend on deployment A for data storage services, the performance of each deployment is impacted. This may result in what appears to be a networking issue between each of the deployments because data storage is being slowed due to the reduced throughput of data storage by deployment A (610A).

Based on deployment level monitoring, a support manager (not shown) will identify a common component failure across all three deployments because of the common decrease in performance. To address the common decrease in performance, the support manager may select a first corrective action of replacing network interfaces (e.g., 624) of the deployments.

Figure 6C:
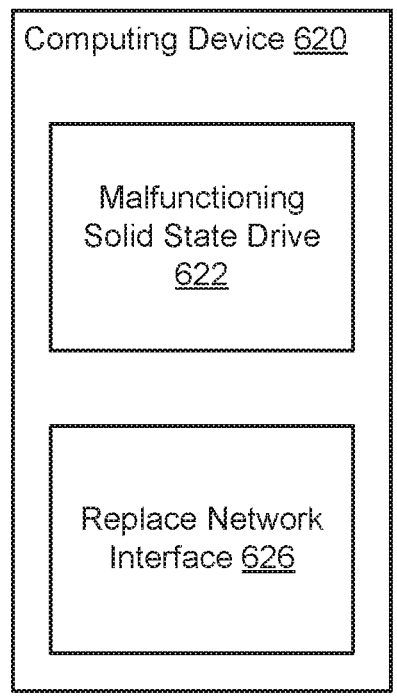
FIG. 6C shows a diagram of the computing device of FIG. 6B after a first corrective action has been performed.

However, as shown in FIG. 6C, performing a replacement (626) of the network interface did not remediate the decrease in performance due to the malfunctioning solid state drive (622). After performing the corrective action, the support manager may obtain information regarding the deployment to identify an outcome. In this case, the information may be the rate of network traffic across the distributed system. Since the underlying problem of the malfunctioning solid state drive (622) is still impacting the system, the outcome was that of a continued decrease in network performance.

In response to obtaining the outcome, the support manager selected a second corrective action based on the outcome. The second corrective action was a replacement of solid state drives.

Figure 6D:
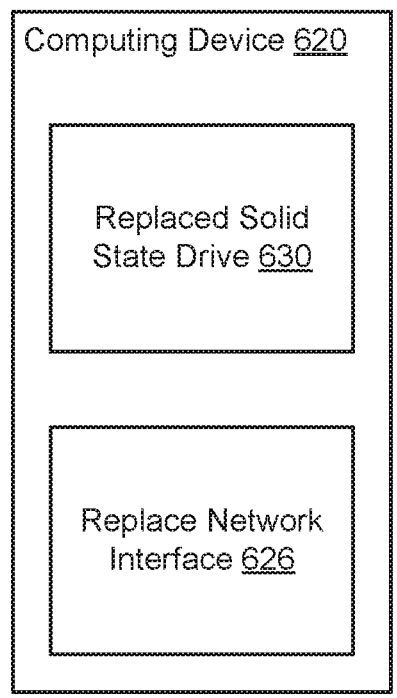
FIG. 6D shows a diagram of the computing device of FIG. 6B after a second corrective action has been performed.

FIG. 6D shows a diagram of computing device A (620) after the second corrective action was performed. As seen, the malfunctioning solid state drive was replaced (630) resulting in the performance of the distributed device being restored.

In response to this outcome, the support manager ended the support session.

End of Example 1

Figure 7:
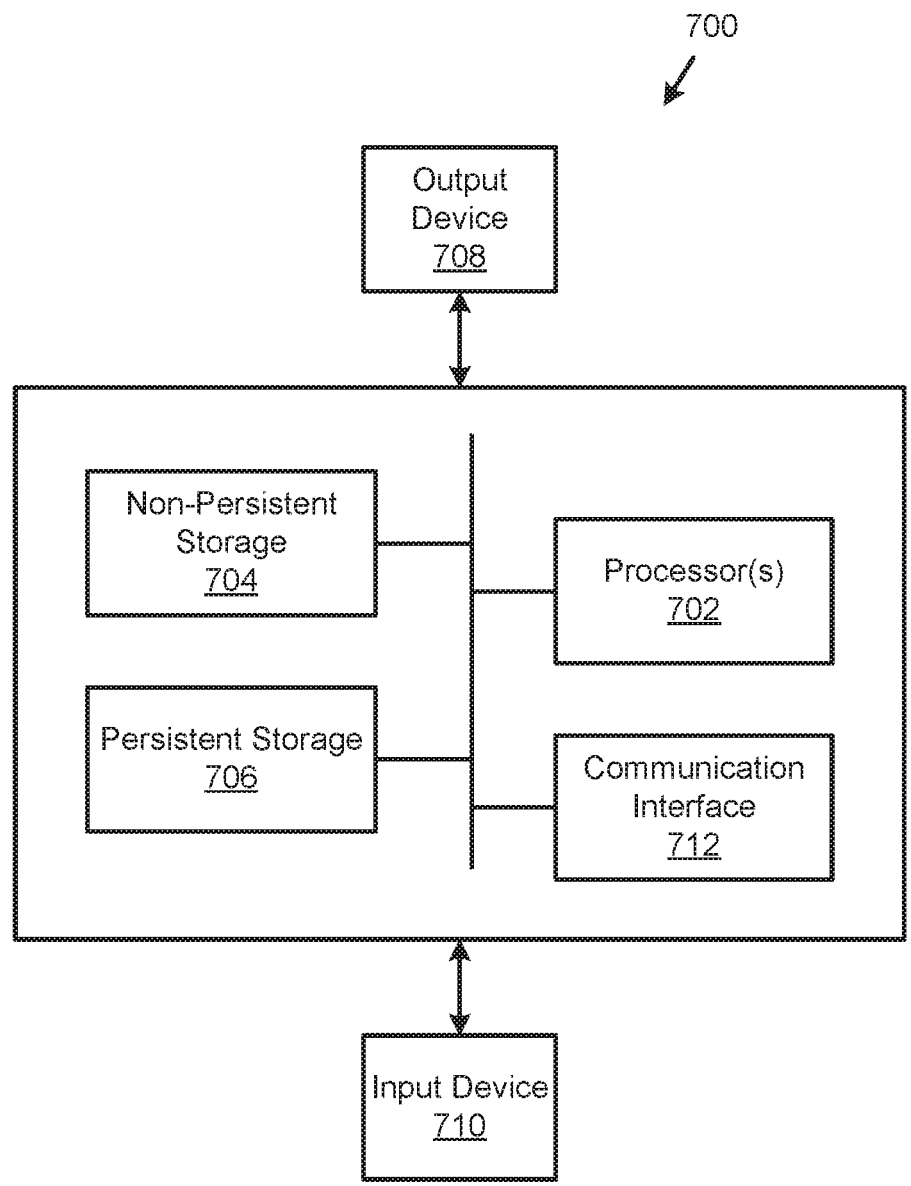
FIG. 7 shows a diagram of a computing device not hosting a validator in accordance with one or more embodiments of the invention.

As discussed above, embodiments of the invention may be implemented using computing devices. FIG. 7 shows a diagram of a computing device that does not host a validator in accordance with one or more embodiments of the invention. The computing device illustrated in FIG. 8 could also host a validator without departing from the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may improve the performance of distributed systems by improving the efficiency of identifying and eliminating malfunctioning components, software or hardware. Embodiments may improve the performance of the distributed systems by improving the uptime of the distributed systems. Specifically, embodiments of the invention may provide a method of iteratively determining a series of corrective actions based on a common component failure across multiple deployments of a distributed system. Doing so reduces the number of corrective actions that may need to be performed to repair the distributed solution when a component fails. For example, a failure of a component may manifest itself throughout a distributed solution in unexpected ways and impact the performance of other computing devices, deployments, etc. . . . . Traditional approaches to repair distributed systems focus on relating decreases in the performance of individual components to corrective actions. Consequently, the traditional approach may needlessly cause applications or hardware to be replaced that is not, in fact, the cause of the decreased performance of the distributed system. Embodiments of the invention may prevent this problem by performing iterative corrective actions across a set of deployments that appear to have a common component failure. As deployment states diverge, different groups of deployments may be identified as having different common component failures. In this manner, a distribute system that is impacted by a malfunctioning or otherwise failed component may be corrected without needlessly replacing components, application, or firmware. Thus, embodiments of the invention may improve an uptime of a distribute system and decrease a cost of supporting the distributed system.

Accordingly, one or more embodiments of the invention address the problem of detecting and correcting component failure in a distributed system. Since the failure of a component in a distributed system may cause unpredictable performance penalties, embodiments of the invention necessarily address problems that are rooted in computing technology. That is the identification of component failure and remediation of failed components in a distributed environment that might otherwise mask the true cause of a performance decrease of a distributed system.

While embodiments of the invention have been described as addressing one or more problems, embodiments of the invention are applicable to address other problems and the scope of the invention should not be limited to addressing the problems specifically discussed throughout this application.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A support engine for managing a distributed system, comprising:
   a persistent storage comprising a heuristically derived knowledge base; and
   a processor programmed to:
      perform deployment level monitoring of deployments of the distributed system;
      identify a common component failure of the deployments based on the deployment level monitoring, wherein the deployments comprise a first deployment and a second deployment, wherein the common component failure is identified when a similar decrease in performance in each of the deployments is detected using the deployment level monitoring;
      in response to identifying the common component failure:
         identify a plurality of impacted computing devices, wherein each of the deployments comprises at least of one of the plurality of impacted computing devices;
         obtain deployment level state information from each of the plurality of impacted computing devices;
         identify an iterative set of outcome driven corrective actions based on the obtained deployment level state information and the heuristically derived knowledge base; and
         initiate a computing device correction on an impacted computing device of the plurality of impacted computing devices using the iterative set of outcome driven corrective actions to obtain a corrected computing device.

2. The support engine of claim 1, wherein the iterative set of outcome driven corrective actions comprises:
   a primary corrective action associated with the deployment level state information.

3. The support engine of claim 2, wherein the iterative set of outcome driven corrective actions further comprises:
   a first plurality of primary outcomes associated with the primary corrective action,
   wherein each primary outcome of the first plurality of primary outcomes specifies different deployment level state information.

4. The support engine of claim 3, wherein the iterative set of outcome driven corrective actions further comprises:
   a secondary corrective action associated with a primary outcome of the plurality of primary outcomes.

5. The support engine of claim 4, wherein the heuristically derived knowledge base comprises:
   the primary corrective action;
   the plurality of primary outcomes; and
   the secondary corrective action.

6. The support engine of claim 1, wherein a first deployment of the deployments provides data storage services to the distributed system.

7. The support engine of claim 6, wherein a second deployment of the deployments provides computation services to the distributed system.

8. The support engine of claim 6, wherein a second deployment of the deployments provides caching services to the distributed system.

9. The support engine of claim 1, wherein the processor is further programmed to:
   make a determination that the corrected computing device is in a malfunctioning state after initiating the iterative set of outcome driven corrective actions; and
   in response to the determination, update the heuristically derived knowledge base.

10. The support engine of claim 9, wherein updating the heuristically derived knowledge base comprises:
    adding a new outcome based on the malfunctioning state; and
    adding a new corrective action associated with the new outcome.

11. The support engine of claim 1, wherein each impacted computing device is a member of the deployments.

12. A method for managing a distributed system, comprising:
    perform deployment level monitoring of deployments of the distributed system;
    identify a common component failure of the deployments based on the deployment level monitoring, wherein the deployments comprise a first deployment and a second deployment, wherein the common component failure is identified when a similar decrease in performance in each of the deployments is detected using the deployment level monitoring;
    in response to identifying the common component failure:
       identify a plurality of impacted computing devices, wherein each of the deployments comprises at least of one of the plurality of impacted computing devices;
       obtaining deployment level state information from each of the plurality of impacted computing devices;
       identifying an iterative set of outcome driven corrective actions based on the obtained deployment level state information and a heuristically derived knowledge base; and
       initiating a computing device correction on an impacted computing device of the plurality of impacted computing devices using the iterative set of outcome driven corrective actions to obtain a corrected computing device.

13. The method of claim 12, wherein the iterative set of outcome driven corrective actions comprises:
    a primary corrective action associated with the deployment level state information.

14. The method of claim 13, wherein the iterative set of outcome driven corrective actions further comprises:
    a first plurality of primary outcomes associated with the primary corrective action,
    wherein each primary outcome of the first plurality of primary outcomes specifies different deployment level state information.

15. The method of claim 14, wherein the iterative set of outcome driven corrective actions further comprises:
    a secondary corrective action associated with a primary outcome of the plurality of primary outcomes.

16. The method of claim 15, wherein the heuristically derived knowledge base comprises:

the primary corrective action;
the plurality of primary outcomes; and
the secondary corrective action.

17. A non-transitory computer readable medium comprising computer readable program code, which when executed by a computer processor enables the computer processor to perform a method for managing a distributed system, the method comprising:
  performing deployment level monitoring of deployments of the distributed system;
  identifying a common component failure of the deployments based on the deployment level monitoring, wherein the deployments comprise a first deployment and a second deployment, wherein the common component failure is identified when a similar decrease in performance in each of the deployments is detected using the deployment level monitoring;
  in response to identifying the common component failure:
    identifying a plurality of impacted computing devices, wherein each of the deployments comprises at least of one of the plurality of impacted computing devices;
    obtaining deployment level state information from each of the plurality of impacted computing devices;
    identifying an iterative set of outcome driven corrective actions based on the obtained deployment level state information and a heuristically derived knowledge base; and
  initiating a computing device correction on an impacted computing device of the plurality of impacted computing devices using the iterative set of outcome driven corrective actions to obtain a corrected computing device.

* * * * *